US009807421B2

(12) United States Patent
Deshpande

(10) Patent No.: US 9,807,421 B2
(45) Date of Patent: Oct. 31, 2017

(54) NAL UNIT TYPE RESTRICTIONS

(71) Applicant: Sharp Kabushiki Kaisha, Osaka-shi, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 568 days.

(21) Appl. No.: 13/857,860

(22) Filed: Apr. 5, 2013

(65) Prior Publication Data
US 2014/0301451 A1 Oct. 9, 2014

(51) Int. Cl.
| H04N 7/32 | (2006.01) |
| H04N 7/26 | (2006.01) |
| H04N 19/597 | (2014.01) |
| H04N 19/30 | (2014.01) |
| H04N 19/82 | (2014.01) |
| H04N 19/70 | (2014.01) |
| H04N 19/46 | (2014.01) |

(52) U.S. Cl.
CPC ........... *H04N 19/597* (2014.11); *H04N 19/30* (2014.11); *H04N 19/82* (2014.11); *H04N 19/46* (2014.11); *H04N 19/70* (2014.11)

(58) Field of Classification Search
CPC ...... H04N 19/30; H04N 19/46; H04N 19/597; H04N 19/70; H04N 19/82
See application file for complete search history.

(56) References Cited

U.S. PATENT DOCUMENTS

| 2006/0262985 A1* | 11/2006 | Chen | H04N 19/105 382/240 |
| 2006/0268841 A1* | 11/2006 | Nagaraj | H04L 1/0083 370/352 |
| 2008/0002767 A1* | 1/2008 | Schwarz | H04N 19/147 375/240.12 |
| 2009/0110054 A1* | 4/2009 | Kim | H04N 19/647 375/240.1 |
| 2010/0158135 A1* | 6/2010 | Yin | H04N 19/70 375/240.26 |
| 2010/0165077 A1* | 7/2010 | Yin et al. | 348/42 |
| 2010/0232520 A1* | 9/2010 | Wu | H04N 21/2362 375/240.26 |
| 2011/0122944 A1* | 5/2011 | Gupta | H04N 19/176 375/240.12 |
| 2011/0134994 A1 | 6/2011 | Lu et al. | |
| 2013/0279599 A1* | 10/2013 | Wang | H04N 19/00139 375/240.25 |

OTHER PUBLICATIONS

Jianle Chen. SHVC Draft Text 1,Jan. 2013, Qualcomm Incorporated.*
Wang et al., System and Transport Interface of SVC, IEEE Transactions on Circuits and Systems for Video Technology, vol. 17, No. 9, Sep. 2007, 15 pgs.
Shen et al., CE6: Enhancement-layer IDR (EIDR) picture, Joint VideoTeam, JVT-R053, 18th Meeting, Bangkok, Thailand, Jan. 14-20, 2006, 7 pgs.

(Continued)

*Primary Examiner* — Md Haque
(74) *Attorney, Agent, or Firm* — Keating & Bennett, LLP

(57) ABSTRACT

A system for encoding and/or decoding video that include NAL unit types.

2 Claims, 19 Drawing Sheets

(56) References Cited

OTHER PUBLICATIONS

Wang, Enhancement-layer IDR (EIDR) picture, Joint VideoTeam, JVT-R065, 17th Meeting, Nice, France, Oct. 14-21, 2005, 7 pgs.
International Search Report, mailed Jul. 1, 2014, PCT International Application No. PCT/JP2014/001996, Sharp Kabushiki Kaisha, 7 pgs.
Deshpande, Comments on SHVC and MV-HEVC, Joint Collaborative Team on Video Coding (JCT-VC), JCTVC-M0208, ITU-T, 13th Meeting, Incheon, KR, Apr. 8, 2013, 6 pgs.
Deshpande, Comments on SHVC and MV-HEVC, Joint Collaborative Team on 3D Video Coding, JCT3V-D0081, ITUT, 4th Meeting, Incheon, KR, Apr. 12, 2013, 6 pgs.
Deshpande, Layer Dependency Signaling in VPS Extension, Joint Collaborative Team on Video Coding, JCTVC-L0446rl, 12th Meeting, Geneva, CH, Jan. 14-23, 2013, 2 pgs.
Deshpande, On Layer Dependency Signaling, Joint Collaborative Team on Video Coding, JCTVC-L0210, 12th Meeting, Geneva, CH, Jan. 14-23, 2015, 8 pgs.
Hendry et al., AHG9: On inter-layer dependency signalling in VPS extension, Joint Collaborative Team on Video Coding, JCTVC-L0263, 12th Meeting, Geneva, CH, Jan. 14-23, 2013, 3 pgs.
Chen et al., SHVC Draft Text 1, Joint Collaborative Team on Video Coding, JCTVC-L1008, 12th Meeting, Geneva, CH, Jan. 14-23, 2013, 33 pgs.
Bross et al., High efficiency video coding (HEVC) text specification draft 8, JCTVC-J1003, Stockholm, Jul. 2012, 50 pgs., Part 1.
Bross et al., High efficiency video coding (HEVC) text specification draft 8, JCTVC-J1003, Stockholm, Jul. 2012, 50 pgs., Part 2.
Bross et al., High efficiency video coding (HEVC) text specification draft 8, JCTVC-J1003, Stockholm, Jul. 2012, 50 pgs., Part 3.
Bross et al., High efficiency video coding (HEVC) text specification draft 8, JCTVC-J1003, Stockholm, Jul. 2012, 50 pgs., Part 4.
Bross et al., High efficiency video coding (HEVC) text specification draft 8, JCTVC-J1003, Stockholm, Jul. 2012, 50 pgs., Part 5.
Bross et al., High efficiency video coding (HEVC) text specification draft 8, JCTVC-J1003, Stockholm, Jul. 2012, 10 pgs., Part 6.
Official Communication issued in corresponding European Patent Application No. 14780078.3, mailed on Aug. 5, 2016.
Hannuksela, M., "On SHVC RAP Pictures," Joint Collaborative Team on Video Coding (JCT-VC) of ITU-T SG 16 WP 3 and ISO/IEC JTC 1/SC 29/WG 11; JCTVC-L0039; Jan. 7, 2013, 7 pages.

* cited by examiner

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1) | |
|       colour_plane_id | u(2) |
|     pic_order_cnt_lsb | u(v) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 10

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrBlaPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|     ... | |

SLICE HEADER

FIG. 11

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( !IdrBlaPicFlag ) | |
|       pic_order_cnt_lsb | u(v) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|     ... | |

SLICE HEADER

FIG. 12

| slice_header( ) { | Descriptor |
|---|---|
| pic_order_cnt_lsb | u(v) |
| first_slice_in_pic_flag | u(1) |
| if( RapPicFlag ) | |
|     no_output_of_prior_pics_flag | u(1) |
| pic_parameter_set_id | ue(v) |
| if( !first_slice_in_pic_flag ) | |
|     slice_address | u(v) |
| if( dependent_slice_enabled_flag && !first_slice_in_pic_flag ) | |
|     dependent_slice_flag | u(1) |
| if( !dependent_slice_flag ) { | |
|     slice_type | ue(v) |
|     if( output_flag_present_flag ) | |
|         pic_output_flag | u(1) |
|     if( separate_colour_plane_flag == 1 ) | |
|         colour_plane_id | u(2) |
|     if( !IdrPicFlag ) { | |
|         short_term_ref_pic_set_sps_flag | u(1) |
|     if( !short_term_ref_pic_set_sps_flag ) | |
|         short_term_ref_pic_set( num_short_term_ref_pic_sets ) | |
|     else | |
|         short_term_ref_pic_set_idx | u(v) |
| ... | |

SLICE HEADER

FIG. 13

| video_parameter_set_rbsp( ) { | Descriptor |
|---|---|
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_extension_offset //vps_reserved_0xffff_16bits | u(16) |
|   profile_tier_level( 1, vps_max_sub_layers_minus1 ) | |
|   vps_sub_layer_ordering_info_present_flag | u(1) |
|   for( i = ( vps_sub_layer_ordering_info_present_flag ?0 : vps_max_sub_layers_minus1 ); <br>     i <= vps_max_sub_layers_minus1; i++ ) { | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_max_layer_id | u(6) |
|   vps_num_layer_sets_minus1 | ue(v) |
|   for( i = 1; i <= vps_num_layer_sets_minus1; i++ ) | |
|     for( j = 0; j <= vps_max_layer_id; j++ ) | |
|       layer_id_included_flag[ i ][ j ] | u(1) |
|   vps_timing_info_present_flag | u(1) |
|   if( vps_timing_info_present_flag ) { | |
|     vps_num_units_in_tick | u(32) |
|     vps_time_scale | u(32) |
|     vps_poc_proportional_to_timing_flag | u(1) |
|     if ( vps_poc_proportional_to_timing_flag ) | |
|       vps_num_ticks_poc_diff_one_minus1 | ue(v) |
|     vps_num_hrd_parameters | ue(v) |
|     for( i = 0; i < vps_num_hrd_parameters; i++ ) { | |
|       hrd_layer_set_idx[ i ] | ue(v) |
|       if( i > 0 ) | |
|         cprms_present_flag[ i ] | u(1) |
|       hrd_parameters( cprms_present_flag[ i ], vps_max_sub_layers_minus1 ) | |
|     } | |
|   } | |
|   vps_extension_flag | u(1) |
|   if( vps_extension_flag ) { | |
|     vps_extension( ) | |
|     vps_extension2_flag | u(1) |
|     if( vps_extension2_flag ) | |
|       while( more_rbsp_data( ) ) | |
|         vps_extension_data_flag | u(1) |
|   } | |
|   rbsp_trailing_bits( ) | |
| } | |

FIG. 14

| vsp_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j <NumScalabilityTypes; j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag | |
|       layer_id_in_nuh[ i ] | u(6) |
|     for( j = 0; j < NumScalabilityTypes; j++ ) | |
|       dimension_id[ i ][ j ] | u(v) |
|   } | |
|   for( lsIdx = 1; lsIdx <= vps_num_layer_sets_minus1; lsIdx ++ ) { | |
|     vps_profile_present_flag[ lsIdx ] | u(1) |
|     if ( !vps_profile_present_flag[ lsIdx ] ) | |
|       profile_layer_set_ref_minus1[ lsIdx ] | ue(v) |
|     profile_tier_level( vps_profile_present_flag[ lsIdx ], vps_max_sub_layers_minus1) | |
|   } | |
|   num_output_layer_sets | ue(v) |
|   for( i = 0; i < num_output_layer_sets; i++ ) { | |
|     output_layer_set_idx[ i ] | ue(v) |
|     lsIdx = output_layer_set_idx[ i ] | |
|     for( j = 0 ; j <= vps_max_layer_id; j++ ) | |
|       if( layer_id_included_flag[ lsIdx ][ j ] ) | |
|         output_layer_flag[ lsIdx ][ j ] | u(1) |
|   } | |
|   for( i = 1; i <= vps_max_layers_minus1; i++ ) | |
|     for( j = 0; j < i; j++ ) | |
|       direct_dependency_flag[ i ][ j ] | u(1) |
| } | |

FIG. 15

NAL UNIT TYPE RESTRICTIONS

CROSS-REFERENCE TO RELATED APPLICATIONS

None.

BACKGROUND OF THE INVENTION

The present invention relates to video encoding and decoding.

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors. Some video coding techniques provide higher coding efficiency at the expense of increasing complexity. Increasing image quality requirements and increasing image resolution requirements for video coding techniques also increase the coding complexity.

The increasing popularity of digital media has presented several problems. For example, efficiently representing high-quality digital media for storage, transmittal, and playback presents several challenges. Techniques that represent digital media more efficiently is beneficial.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7 illustrates a frame with a slice and 9 tiles.

FIG. 8 illustrates a frame with three slices and 3 tiles.

FIG. 10 illustrates an exemplary slice header.

FIG. 11 illustrates an exemplary slice header.

FIG. 12 illustrates an exemplary slice header.

FIG. 13 illustrates an exemplary slice header.

FIG. 14 illustrates an exemplary video parameter set.

FIG. 15 illustrates an exemplary VPS extension.

DETAILED DESCRIPTION OF PREFERRED EMBODIMENT

Figure 1A:
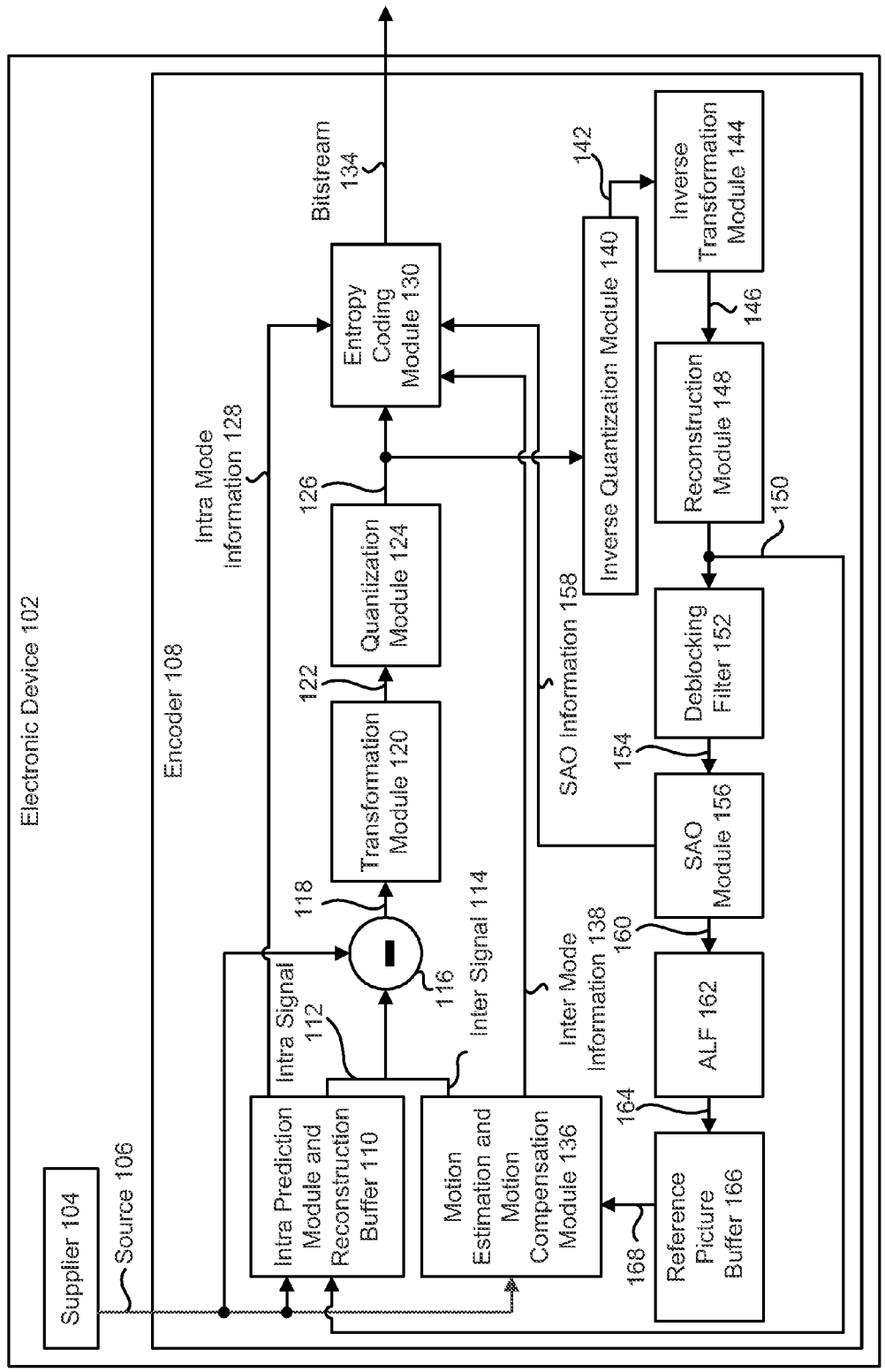
FIG. 1A is a block diagram illustrating one configuration of an electronic device including a HEVC encoder.

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

In HEVC, an entropy coding technique Context-Adaptive Binary Arithmetic Coding CABAC)) is used to compress Transformed and Quantized Coefficients (TQCs) without loss. TQCs may be from different block sizes according to transform sizes (e.g., 4×4, 8×8, 16×16, 32×32).

Two-dimensional (2D) TQCs may be converted into a one-dimensional (1D) array before entropy coding. In one example, 2D arrayed TQCs in a 4×4 block may be arranged as illustrated in Table (1).

TABLE (1)

| 4 | 0 | 1 | 0 |
|---|---|---|---|
| 3 | 2 | −1 | ... |
| −3 | 0 | ... | ... |
| 0 | ... | ... | ... |

When converting the 2D TQCs into a 1D array, the block may be scanned in a diagonal zig-zag fashion. Continuing with the example, the 2D arrayed TQCs illustrated in Table (1) may be converted into 1D arrayed TQCs [4, 0, 3, −3, 2, 1, 0, −1, 0, ... ] by scanning the first row and first column, first row and second column, second row and first column, third row and first column, second row and second column, first row and third column, first row and fourth column, second row and third column, third row and second column, fourth row and first column and so on.

The coding procedure in HEVC may proceed, for example, as follows. The TQCs in the 1D array may be ordered according to scanning position. The scanning position of the last significant coefficient and the last coefficient level may be determined. The last significant coefficient may be coded. It should be noted that coefficients are typically coded in reverse scanning order. Run-level coding may be performed, which encodes information about runs of identical numbers and/or bits rather than encoding the numbers themselves, which is activated directly after the last coefficient coding. Then, level coding may be performed. The term significant coefficient refers to a coefficient that has a coefficient level value that is greater than zero. A coefficient level value refers to a unique indicator of the magnitude (or absolute value) of a Transformed and Quantized Coefficient (TQC) value.

This procedure may be illustrated in Table (2) as a continuation of the example above (with the 1D arrayed TQCs [4, 0, 3, −3, 2, 1, 0, −1, 0, . . . ]).

TABLE (2)

| Scanning Position | 0 | 1 | 2 | 3 | 4 | 5 | 6 | 7 | ... |
|---|---|---|---|---|---|---|---|---|---|
| Coefficient Level | 4 | 0 | 3 | −3 | 2 | 1 | 0 | −1 | ... |
| Last Position |  |  |  |  |  |  |  | 7 |  |
| Last Coefficient Level |  |  |  |  |  |  |  | −1 |  |
| Run-Level Coding |  |  |  |  | 2 | 1 | 0 |  |  |
| Level Coding | 4 | 0 | 3 | −3 |  |  |  |  |  |

In Table (2), for example, the coefficient level −1 at scanning position 7 may be the last non-zero coefficient. Thus, the last position is scanning position 7 and the last coefficient level is −1. Run-level coding may be performed for coefficients 0, 1 and 2 at scanning positions 6, 5 and 4 (where coefficients are coded in reverse scanning order). Then, level coding may be performed for the coefficient levels −3, 3, 0 and 4.

FIG. 1A is a block diagram illustrating one configuration of an electronic device 102 in which video may be coded. It should be noted that one or more of the elements illustrated as included within the electronic device 102 may be implemented in hardware, software, or a combination of both. For example, the electronic device 102 includes a encoder 108, which may be implemented in hardware, software or a combination of both. For instance, the encoder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 108 may be a high efficiency video coding (HEVC) coder.

The electronic device 102 may include a supplier 104. The supplier 104 may provide picture or image data (e.g., video) as a source 106 to the encoder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The encoder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 decompresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. In addition, the block may be non-square where the number of TQCs 126 is the height times the width of the block. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2A:
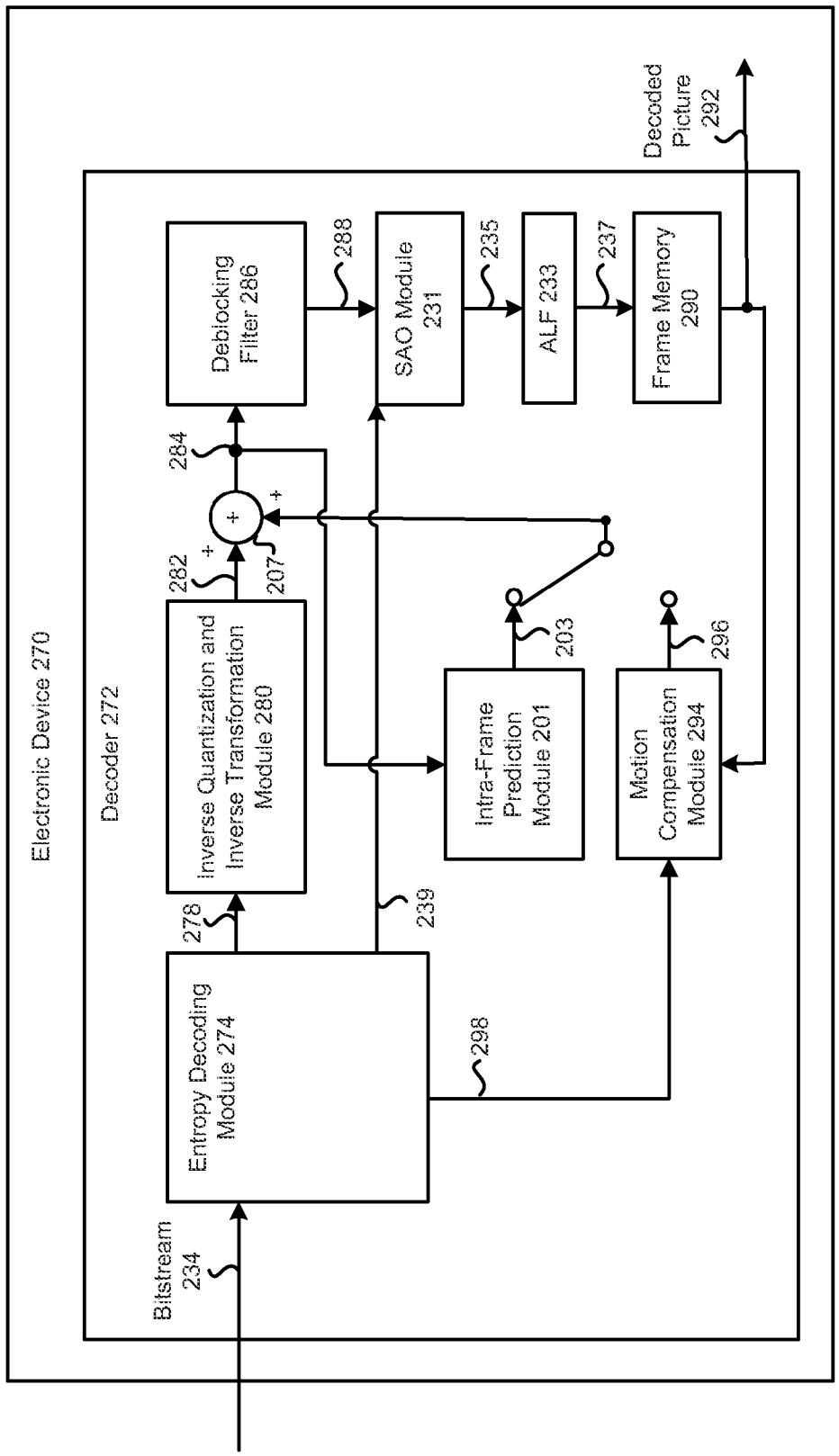
FIG. 2A is a block diagram illustrating one configuration of an electronic device including a HEVC decoder.
Figure 2B:
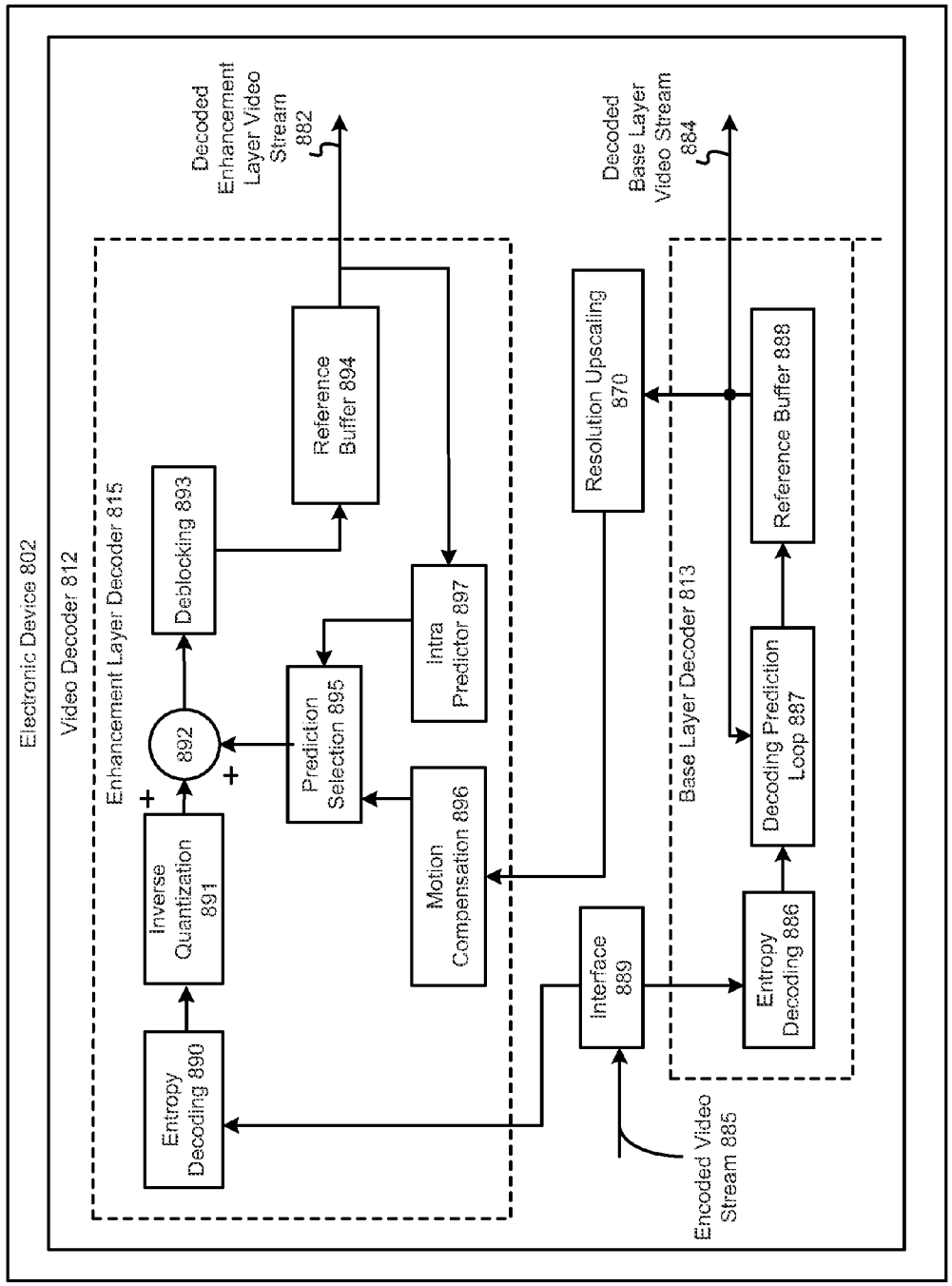
FIG. 2B is a block diagram illustrating one configuration of an electronic device including a HEVC decoder with enhancement layers.

FIG. 2B is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 278.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., encoder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 1B:
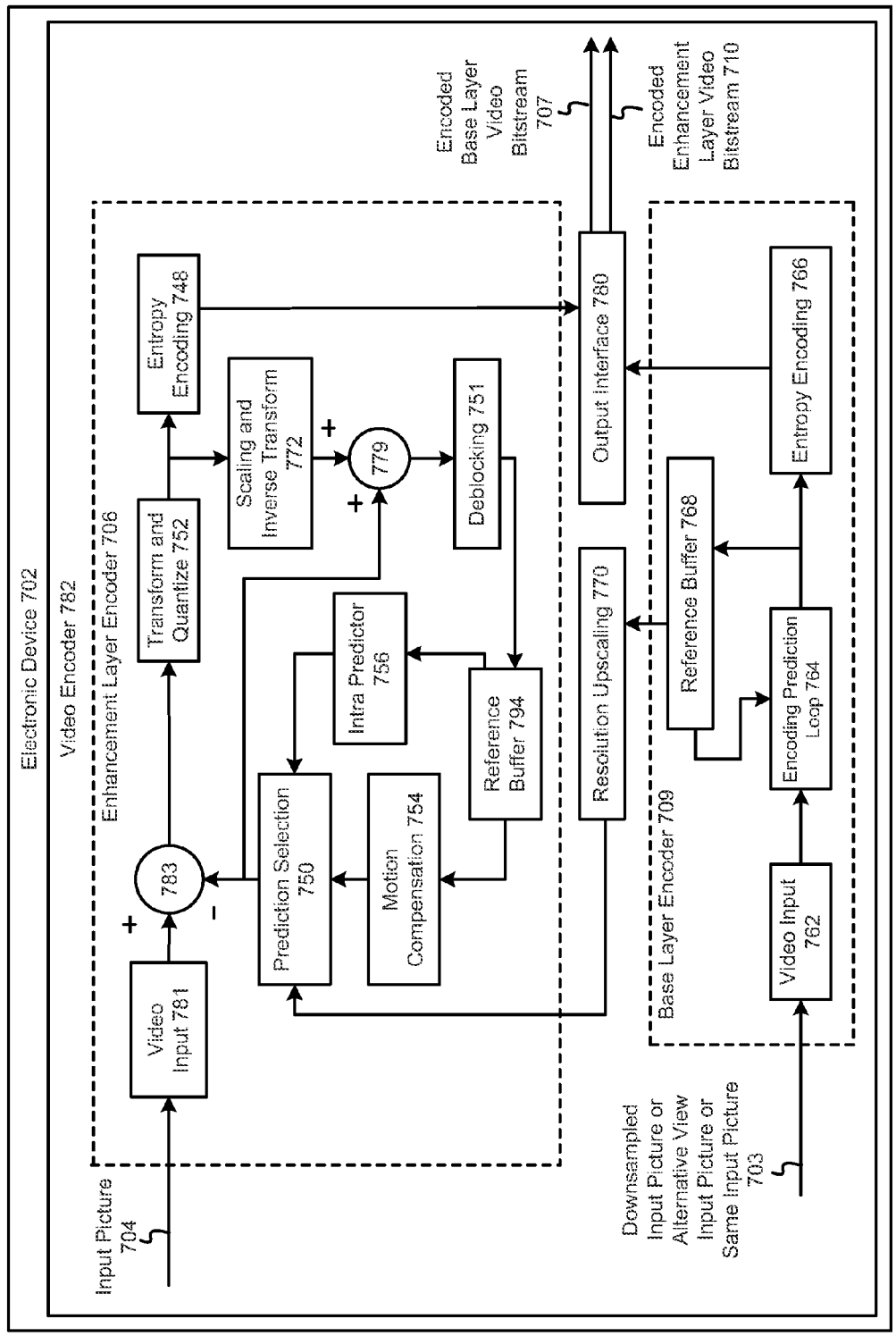
FIG. 1B is a block diagram illustrating one configuration of an electronic device including a HEVC encoder with enhancement layers.

FIG. 1B is a block diagram illustrating one configuration of a video encoder 782 on an electronic device 702. The video encoder 782 of FIG. 1B may be one configuration of the video encoder 108 of FIG. 1A. The video encoder 782 may include an enhancement layer encoder 706, a base layer encoder 709, a resolution upscaling block 770 and an output interface 780. The video encoder of FIG. 1B, for example, is suitable for scalable video coding and multi-view video coding, as described herein.

The enhancement layer encoder 706 may include a video input 781 that receives an input picture 704. The output of the video input 781 may be provided to an adder/subtractor 783 that receives an output of a prediction selection 750. The output of the adder/subtractor 783 may be provided to a transform and quantize block 752. The output of the transform and quantize block 752 may be provided to an entropy encoding 748 block and a scaling and inverse transform block 772. After entropy encoding 748 is performed, the output of the entropy encoding block 748 may be provided to the output interface 780. The output interface 780 may output both the encoded base layer video bitstream 707 and the encoded enhancement layer video bitstream 710.

The output of the scaling and inverse transform block 772 may be provided to an adder 779. The adder 779 may also receive the output of the prediction selection 750. The output of the adder 779 may be provided to a deblocking block 751. The output of the deblocking block 751 may be provided to a reference buffer 794. An output of the reference buffer 794 may be provided to a motion compensation block 754. The output of the motion compensation block 754 may be provided to the prediction selection 750. An output of the reference buffer 794 may also be provided to an intra predictor 756. The output of the intra predictor 756 may be provided to the prediction selection 750. The prediction selection 750 may also receive an output of the resolution upscaling block 770.

The base layer encoder 709 may include a video input 762 that receives a downsampled input picture, or other image content suitable for combing with another image, or an alternative view input picture or the same input picture 703 (i.e., the same as the input picture 704 received by the enhancement layer encoder 706). The output of the video input 762 may be provided to an encoding prediction loop 764. Entropy encoding 766 may be provided on the output of the encoding prediction loop 764. The output of the encoding prediction loop 764 may also be provided to a reference buffer 768. The reference buffer 768 may provide feedback to the encoding prediction loop 764. The output of the reference buffer 768 may also be provided to the resolution upscaling block 770. Once entropy encoding 766 has been performed, the output may be provided to the output interface 780.

FIG. 2B is a block diagram illustrating one configuration of a video decoder 812 on an electronic device 802. The video decoder 812 of FIG. 2B may be one configuration of the video decoder 272 of FIG. 2A. The video decoder 812 may include an enhancement layer decoder 815 and a base layer decoder 813. The video decoder 812 may also include an interface 889 and resolution upscaling 870. The video decoder of FIG. 2B, for example, is suitable for scalable video coding and multi-view video encoded, as described herein.

The interface 889 may receive an encoded video stream 885. The encoded video stream 885 may consist of base layer encoded video stream and enhancement layer encoded video stream. These two streams may be sent separately or together. The interface 889 may provide some or all of the encoded video stream 885 to an entropy decoding block 886 in the base layer decoder 813. The output of the entropy decoding block 886 may be provided to a decoding prediction loop 887. The output of the decoding prediction loop 887 may be provided to a reference buffer 888. The reference buffer may provide feedback to the decoding prediction loop 887. The reference buffer 888 may also output the decoded base layer video stream 884.

The interface 889 may also provide some or all of the encoded video stream 885 to an entropy decoding block 890 in the enhancement layer decoder 815. The output of the entropy decoding block 890 may be provided to an inverse quantization block 891. The output of the inverse quantization block 891 may be provided to an adder 892. The adder 892 may add the output of the inverse quantization block 891 and the output of a prediction selection block 895. The output of the adder 892 may be provided to a deblocking block 893. The output of the deblocking block 893 may be provided to a reference buffer 894. The reference buffer 894 may output the decoded enhancement layer video stream 882. The output of the reference buffer 894 may also be provided to an intra predictor 897. The enhancement layer decoder 815 may include motion compensation 896. The motion compensation 896 may be performed after the resolution upscaling 870. The prediction selection block 895 may receive the output of the intra predictor 897 and the output of the motion compensation 896.

Figure 3A:
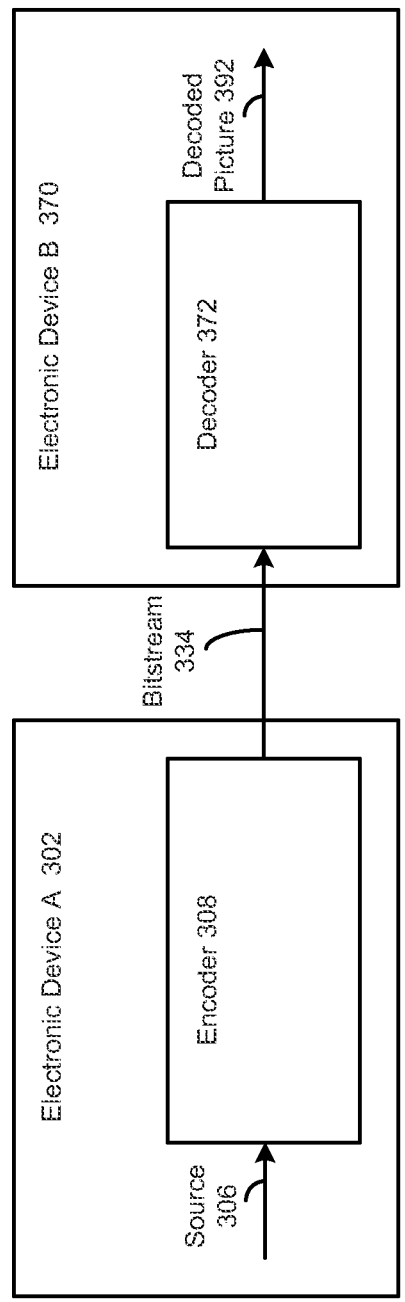
FIG. 3A is a block diagram illustrating one example of an encoder and a decoder.

FIG. 3A is a block diagram illustrating one example of an encoder 308 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes the encoder 308. The encoder 308 may be implemented in hardware, software or a combination of both. In one configuration, the encoder 308 may be a high-efficiency video coding (HEVC) coder. Other coders may likewise be used. Electronic device A 302 may obtain a source 306. In some configurations, the source 306 may be captured on electronic device A 302 using an image sensor, retrieved from memory or received from another electronic device.

The encoder 308 may code the source 306 to produce a bitstream 334. For example, the encoder 308 may code a series of pictures (e.g., video) in the source 306. The encoder 308 may be similar to the encoder 108 described above in connection with FIG. 1A.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to the decoder 372. In one example, the bitstream 334 may be transmitted to electronic device B 370 using a wired or wireless link. In some cases, this may be done over a network, such as the Internet or a Local Area Network (LAN). As illustrated in FIG. 3A, the decoder 372 may be implemented on electronic device B 370 separately from the encoder 308 on electronic device A 302. However, it should be noted that the encoder 308 and decoder 372 may be implemented on the same electronic device in some configurations. In an implementation where the encoder 308 and decoder 372 are implemented on the same electronic device, for instance, the bitstream 334 may be provided over a bus to the decoder 372 or stored in memory for retrieval by the decoder 372. The decoder 372 may provide a decoded picture 392 output.

The decoder 372 may be implemented in hardware, software or a combination of both. In one configuration, the decoder 372 may be a high-efficiency video coding (HEVC) decoder. Other decoders may likewise be used. The decoder 372 may be similar to the decoder 272 described above in connection with FIG. 2A.

Figure 3B:
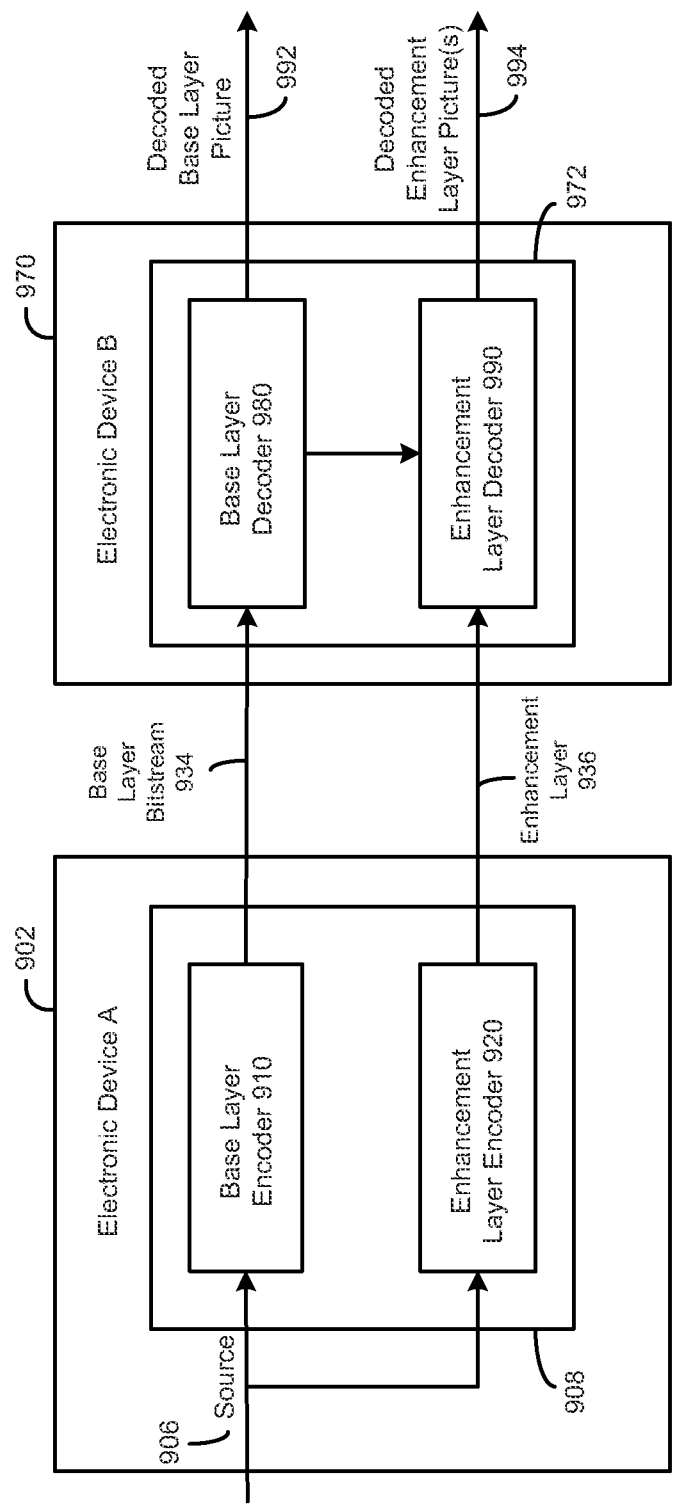
FIG. 3B is a block diagram illustrating one example of an encoder and a decoder with enhancement layers.

FIG. 3B is a block diagram illustrating another example of an encoder 908 and a decoder 972. In this example, electronic device A 902 and electronic device B 970 are illustrated. However, it should be noted that the features and functionality described in relation to electronic device A 902 and electronic device B 970 may be combined into a single electronic device in some configurations.

Electronic device A 902 includes the encoder 908. The encoder 908 may include a base layer encoder 910 and an enhancement layer encoder 920. The video encoder 908 is suitable for scalable video coding and multi-view video coding. The encoder 908 may be implemented in hardware, software or a combination of both. In one configuration, the encoder 908 may be a high-efficiency video coding (HEVC) coder, including scalable and/or multi-view. Other coders may likewise be used. Electronic device A 902 may obtain a source 906. In some configurations, the source 906 may be captured on electronic device A 902 using an image sensor, retrieved from memory or received from another electronic device.

The encoder 908 may code the source 906 to produce a base layer bitstream 934 and an enhancement layer bitstream 936. For example, the encoder 908 may code a series of pictures (e.g., video) in the source 906. In particular, for scalable video encoding for SNR scalability also known as quality scalability the same source 906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 908 may be similar to the encoder 782 described above in connection with FIG. 1B.

The bitstreams 934, 936 may include coded picture data based on the source 906. In some configurations, the bitstreams 934, 936 may also include overhead data, such as slice header information, PPS information, etc. As additional pictures in the source 906 are coded, the bitstreams 934, 936 may include one or more coded pictures.

The bitstreams 934, 936 may be provided to the decoder 972. The decoder 972 may include a base layer decoder 980 and an enhancement layer decoder 990. The video decoder 972 is suitable for scalable video decoding and multi-view video decoding. In one example, the bitstreams 934, 936 may be transmitted to electronic device B 970 using a wired or wireless link. In some cases, this may be done over a network, such as the Internet or a Local Area Network (LAN). As illustrated in FIG. 3B, the decoder 972 may be implemented on electronic device B 970 separately from the encoder 908 on electronic device A 902. However, it should be noted that the encoder 908 and decoder 972 may be implemented on the same electronic device in some configurations. In an implementation where the encoder 908 and decoder 972 are implemented on the same electronic device, for instance, the bitstreams 934, 936 may be provided over a bus to the decoder 972 or stored in memory for retrieval by the decoder 972. The decoder 972 may provide a decoded base layer 992 and decoded enhancement layer picture(s) 994 as output.

The decoder 972 may be implemented in hardware, software or a combination of both. In one configuration, the decoder 972 may be a high-efficiency video coding (HEVC) decoder, including scalable and/or multi-view. Other decoders may likewise be used. The decoder 972 may be similar to the decoder 812 described above in connection with FIG. 2B.

Figure 4:
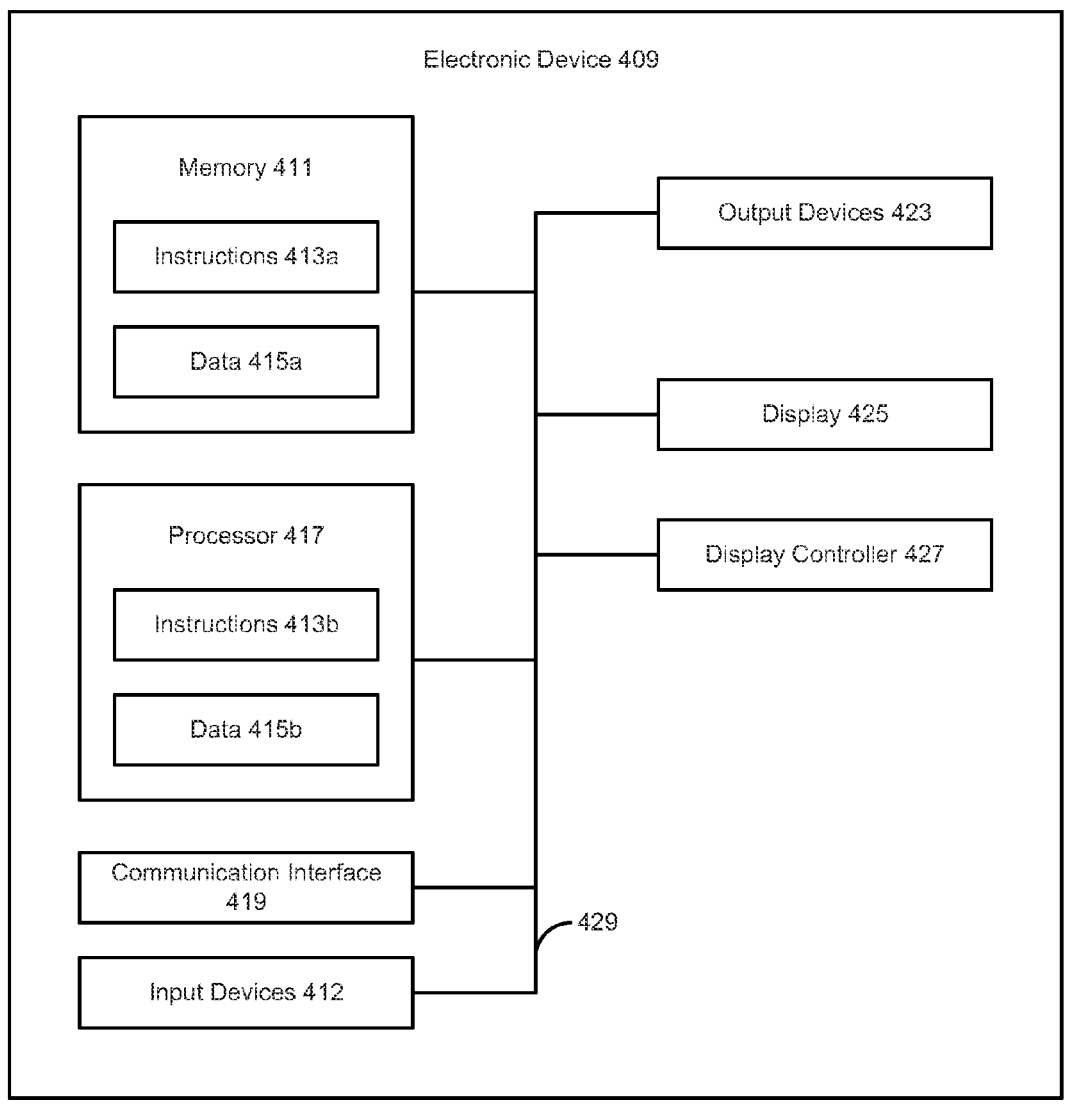
FIG. 4 illustrates various components that may be utilized in an electronic device.

FIG. 4 illustrates various components that may be utilized in an electronic device 409. The electronic device 409 may be implemented as one or more of the electronic devices. For example, the electronic device 409 may be implemented as the electronic device 102 described above in connection with FIG. 1A and FIG. 1B, as the electronic device 270 described above in connection with FIG. 2A and FIG. 2B, or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413*a* (e.g., executable instructions) and data 415*a* to the processor 417. A portion of the memory 411 may also include non-volatile random access memory (NVRAM). The memory 411 may be in electronic communication with the processor 417.

Instructions 413*b* and data 415*b* may also reside in the processor 417. Instructions 413*b* and/or data 415*b* loaded into the processor 417 may also include instructions 413*a* and/or data 415*a* from memory 411 that were loaded for execution or processing by the processor 417. The instructions 413*b* may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, microphone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. The code for the decoder and/or encoder may be stored on a computer readable medium.

An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 5:
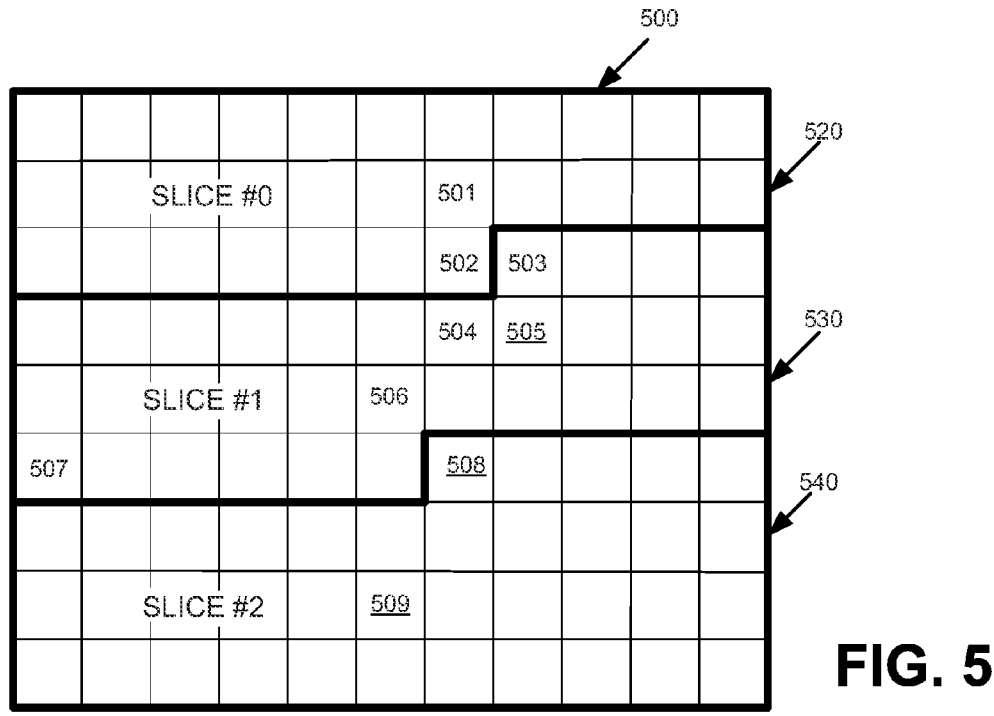
FIG. 5 illustrates an exemplary slice structure.

FIG. 5 illustrates an exemplary video picture 500 comprising eleven blocks in the horizontal direction and nine blocks in the vertical direction (nine exemplary blocks labeled 501-509). FIG. 5 illustrates three exemplary slices: a first slice denoted "SLICE #0" 520, a second slice denoted "SLICE #1" 530 and a third slice denoted "SLICE #2" 540. The decoder may decode and reconstruct the three slices 520, 530, 540, in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 503, in "SLICE #1", blocks (for example, blocks labeled 501 and 502) in "SLICE #0" may not be used for context model selection or reconstruction. Whereas, for a block, for example, the block labeled 505, in "SLICE #1," other blocks (for example, blocks labeled 503 and 504) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Figure 6:
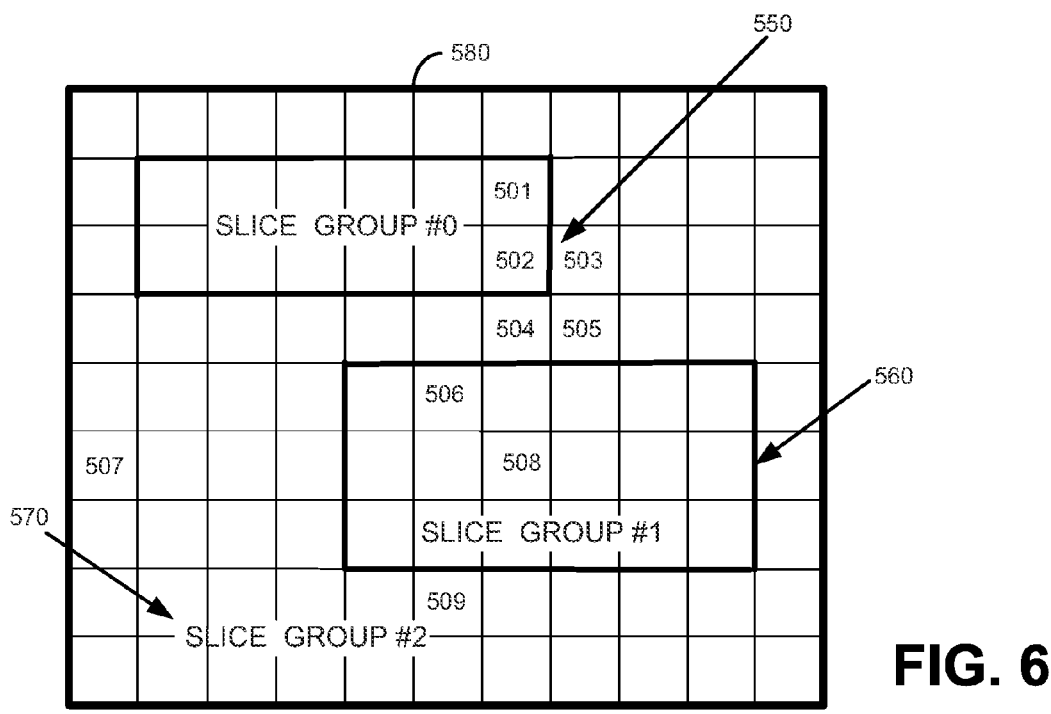
FIG. 6 illustrates another exemplary slice structure.

FIG. 6 depicts an exemplary block allocation into three slice groups: a first slice group denoted "SLICE GROUP #0" 550, a second slice group denoted "SLICE GROUP #1" 560 and a third slice group denoted "SLICE GROUP #2" 570. These slice groups 550, 560, 570, may be associated with two foreground regions and a background region, respectively, in the picture 580.

The arrangement of slices, as illustrated in FIG. 5, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices, as illustrated in FIG. 6, is highly flexible in its arrangement but does not tend to lend itself to high efficient parallel encoding or decoding. Moreover, this highly flexible definition of slices is computationally complex to implement in a decoder.

Figure 7:
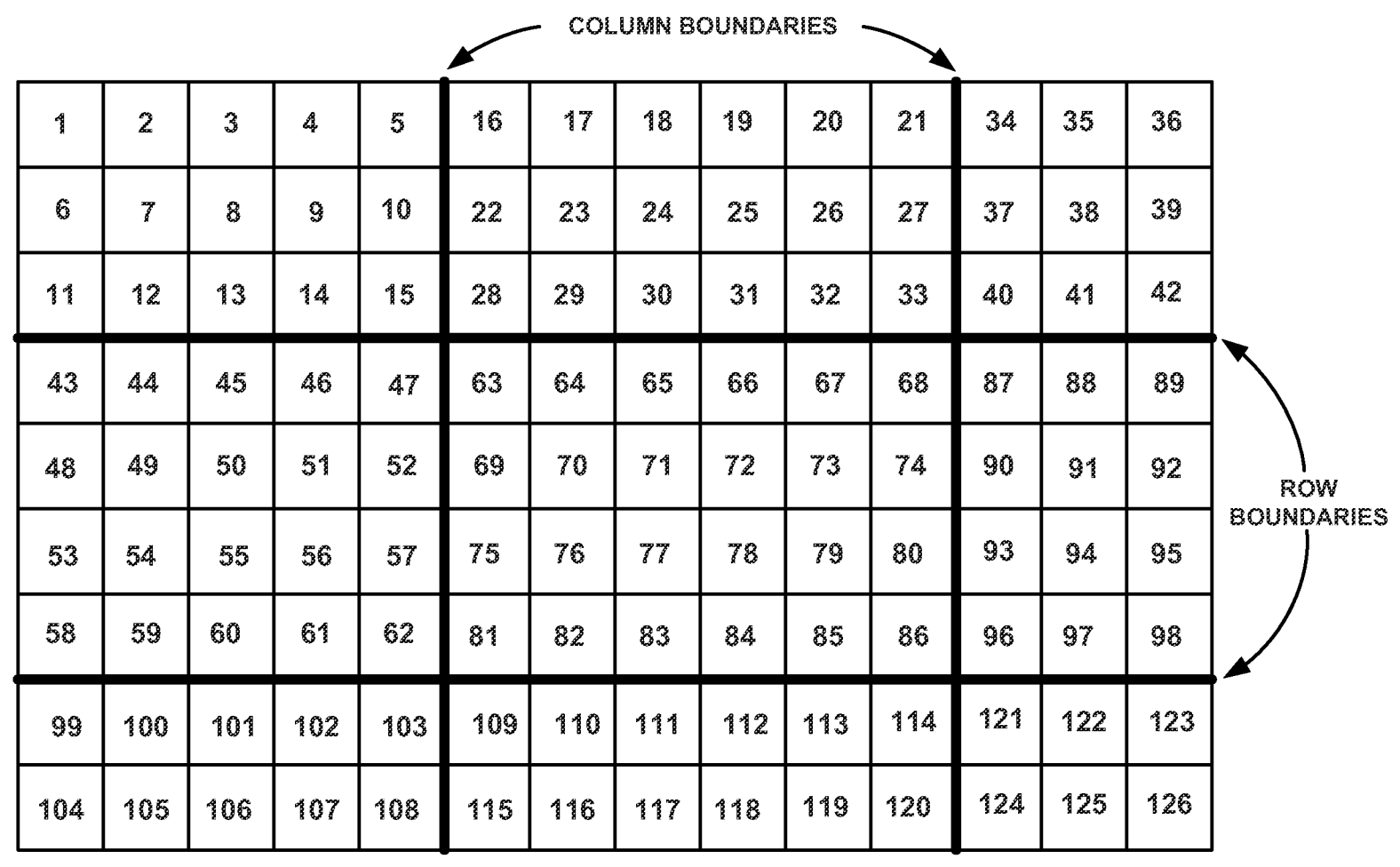

Referring to FIG. 7, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 7. In some embodiments, blocks located in different tiles are not available for intra-prediction, motion compensation, entropy coding context selection or other processes that rely on neighboring block information.

Figure 8:
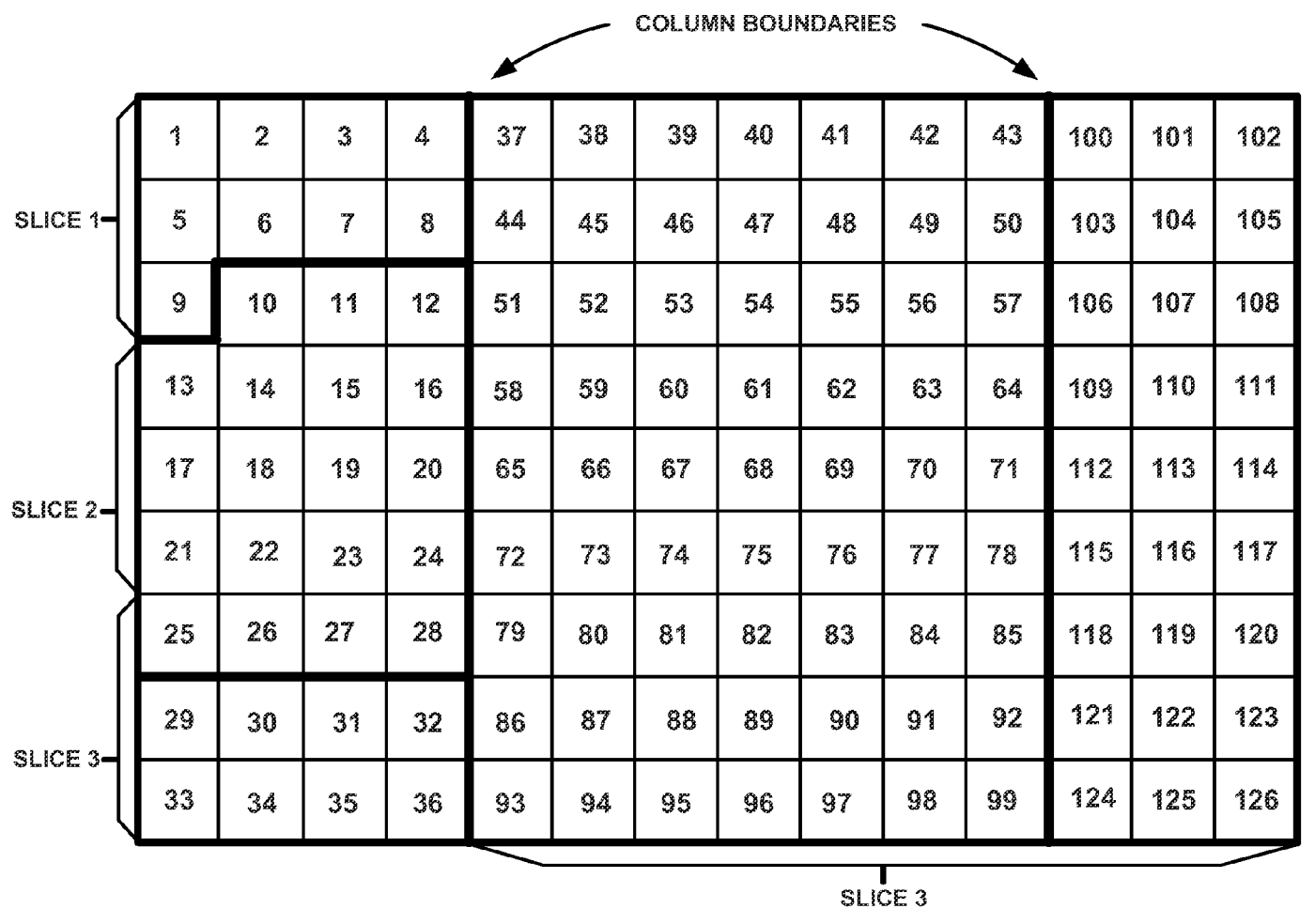

Referring to FIG. 8, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

It is to be understood that in some cases the video coding may optionally not include tiles, and may optionally include the use of a wavefront encoding/decoding pattern for the frames of the video. In this manner, one or more lines of the video (such as a plurality of groups of one or more rows of macroblocks (or alternatively coded tree blocks), each of which group being representative of a wavefront substream may be encoded/decoded in a parallel fashion. In general, the partitioning of the video may be constructed in any suitable manner.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of random access decodable leading picture, coded slice of random access skipped leading picture, video parameter set, sequence parameter set, picture parameter set, access unit delimiter, end of sequence, end of bitstream, filler data, and/or sequence enhancement information message. Table 1 below illustrates one example of NAL unit codes and NAL unit type classes. Other NAL unit types may be included, as desired. It should also be understood that the NAL unit type values for the NAL units shown in the Table 1 may be reshuffled and reassigned. Also additional NAL unit types may be added. Also some NAL unit types may be removed.

TABLE 1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA | VCL |

TABLE 1-continued

NAL unit type codes and NAL unit type classes

| nal_unit_type | Name of nal_unit_type | Content of NAL unit and RBSP syntax structure | NAL unit type class |
|---|---|---|---|
| 5 | STSA_R | picture slice_segment_layer_rbsp( ) | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 ... 31 | RSV_VCL24 ... RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41 ... RSV_NVCL47 | Reserved | non-VCL |
| 48 ... 63 | UNSPEC48 ... UNSPEC63 | Unspecified | non-VCL |

The NAL provides the capability to map the video coding layer (VCL) data that represents the content of the pictures onto various transport layers. The NAL units may be classified into VCL and non-VCL NAL units according to whether they contain coded picture or other associated data, respectively. B. Bros, W-J. Han, J-R. Ohm, G. J. Sullivan, and T-. Wiegand, "High efficiency video coding (HEVC) text specification draft 8," JCTVC-J10003, Stockholm, July 2012 is hereby incorporated by reference herein in its entirety. B. Bros, W-J. Han, J-R. Ohm, G. J. Sullivan, Wang, and T-. Wiegand, "High efficiency video coding (HEVC) text specification draft 10 (for DFIS & Last Call)," JCTVC-J10003_v34, Geneva, January 2013 is hereby incorporated by reference herein in its entirety. B. Bros, W-J. Han, J-R. Ohm, G. J. Sullivan, Wang, and T-. Wiegand, "High efficiency video coding (HEVC) text specification draft 10," JCTVC-L1003, Geneva, January 2013 is hereby incorporated by reference herein in its entirety.

To enable random access and bitstream splicing an IDR access unit contains an intra picture, namely, a coded picture that can be decoded without decoding any previous pictures in the NAL unit stream. Also, the presence of an IDR access unit indicates that no subsequent picture in the bitstream will require reference to pictures prior to the intra picture that it contains in order to be decoded.

An IDR access unit may refer to an IDR picture which contains only I slices, and may be the first picture in the bitstream in decoding order, or may appear later in the bitstream. Each IDR picture is the first picture of a coded video sequence (CVS) in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

A BLA access unit may refer to a BLA picture which contains only I slices, and may be the first picture in the bitstream in decoding order, or may appear later in the bitstream. Each BLA picture may begin a new CVS, and has the same effect on the decoding process as an IDR picture. However, a BLA picture contains syntax elements that specify a non-empty RPS. When a BLA picture for which each VCL NAL unit has nal_unit_type equal to BLA_W_LP, it may have associated RASL pictures, which are not output by the decoder and may not be decodable, as they may contain references to pictures that are not present in the bitstream. When a BLA picture for which each VCL NAL unit has nal_unit_type equal to BLA_W_LP, it may also have associated RADL pictures, which are specified to be decoded. When a BLA picture for which each VCL NAL unit has nal_unit_type equal to BLA_W_RADL, it does not have associated RASL pictures but may have associated RADL pictures. When a BLA picture for which each VCL NAL unit has nal_unit_type equal to BLA_N_LP, it does not have any associated leading pictures.

The clean random access (CRA) picture syntax specifies the use of an intra picture at the location of a random access point (RAP), i.e. a location in a bitstream at which a decoder can begin successfully decoding pictures without needing to decode any pictures that appeared earlier in the bitstream. The support of random access enables effective channel switching, seek operations, and dynamic streaming services. Some pictures that follow a CRA picture in decoding order and precede it in display order (output order) may contain inter-picture prediction references to pictures that are not available at the decoder when starting decoding at the CRA picture. These non-decodable pictures are discarded by a decoder that starts its decoding process at a CRA point. Such non-decodable pictures are identified as random access skipped leading (RASL) pictures. The location of splice points from different original coded bitstreams can be indicated by broken link access (BLA) pictures. A bitstream splicing operation can be performed by changing the NAL unit type of a CRA picture in one bitstream to the value that indicates a BLA picture and concatenating the new bitstream at the position of a RAP picture in the other bitstream. A RAP picture may be an IDR, a CRA, or a BLA picture, and both the CRA and BLA pictures may be followed by RASL pictures in the bitstream (depending on the particular value of the NAL unit type used for a BLA picture) and concatenating the new bitstream at the position of a RAP picture in the other bitstream. Any RASL pictures associated with a BLA picture are discarded by the decoder, as they may contain references to pictures that are not actually present in the bitstream due to a splicing operation. The other type of picture that can follow a RAP picture in decoding order and precede it in output order is the random access decodable leading picture (RADL), which cannot contain references to any pictures that precede the RAP picture in decoding order. RASL and RADL pictures are collectively referred to as leading pictures (LPs). Pictures that follow a RAP picture in both decoding order and output order, are known as trailing pictures, which cannot contain references to LPs for inter-picture prediction.

For multiple-reference picture management, a particular set of previously-decoded pictures needs to be present in the decoded picture buffer (DPB) (see, reference picture buffer 166 of FIG. 1A and frame memory 290 of FIG. 2A) for the decoding of the remainder of the pictures in the bitstream. To identify these pictures, a list of picture order count (POC) identifiers is transmitted in each slice header. The pic_order_cnt_lsb syntax element specifies the picture order count modulo MaxPicOrderCntLsb for the current picture. The length of the pic_order_cnt_lsb syntax element is log 2_max_pic_order_cnt_lsb_minus4+4 bits. The value of the pic_order_ent_lsb is in the range of 0 to MaxPicOrderCntLsb−1, inclusive. The log 2_max_pic_order_cnt_lsb_minus4 specifies the value of the variable MaxPicOrderCntLsb that is used in the decoding process for picture order count as follows:

$$\text{MaxPicOrderCntLsb} = 2^{(log\_2\_max\_pic\_order\_cnt\_lsb\_minus4+4)} \quad (0\text{-}1)$$

The value of log 2_max_pic_order_cnt_lsb_minus4 is in the range of 0 to 12, inclusive.

Figure 9:
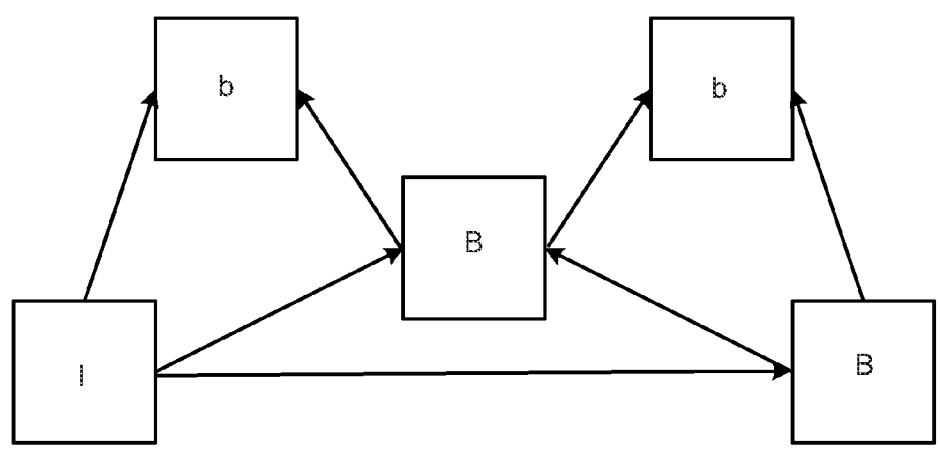
FIG. 9 illustrates POC, decoding order, and RPS.

Reference picture set (RPS) is a set of reference pictures associated with a picture, consisting of all reference pictures that are prior to the associated picture in decoding order, that may be used for inter prediction of the associated picture or any picture following the associated picture in decoding order. FIG. 9 illustrates exemplary POC values, decoding order, and RPS for a temporal prediction structure. In this example the RPS values shown refer to the actual POC values for the RPS. In other cases instead of POC values a difference of POC value of picture with respect to current picture's POC and a indicator signaling if the referred picture is used by current picture ad a reference or not may be stored in the RPS.

Since IDR pictures do not require any previous pictures in order to be decoded, a picture order count for the pic_order_cnt_lsb syntax element may be inferred to be 0 thus reducing the bitrate of the bitstream. The first slice in the picture in decoder order is signaled by a first_slice_inpic_flag being set equal to 1. As a result, the syntax element first_slice_in_pic_flag with a value equal to 1 serves as a boundary to identify the start of an IDR picture in the case where two or more IDR pictures are sent back to back. However, in some cases it is not possible to distinguish between slices belonging to back to back IDR pictures at the video layer. The first such case is if packets arrive out of order at the decoder. The second such case is if the packet containing the first slice of an IDR picture is lost. Also, when all the pictures of a coded video sequence are signaled by intra coding as IDR pictures (e.g., when using an all intra profile) all of the pictures have pic_order_cnt_lsb value of 0. Thus, to permit the decoder to identify a specific IDR picture from another IDR picture, the system should signal a different pic_order_cnt_lsb value for each. In addition, the BLA picture which is similar to an IDR picture, and has only I slices can signal non-zero value for pic_order_cnt_lsb element.

Referring to FIG. 10, to increase the robustness of the decoder in decoding the bitstream, the pic_order_cnt_lsb syntax element should be signaled for IDR pictures. In the embodiment of the slice header illustrated in FIG. 10, the pic_order_cnt_lsb specifies the picture order count modulo MaxPicOrderCntLsb for the current picture. The length of the pic_order_cnt_lsb syntax element is log 2_max_pic_order_cnt_lsb_minus4+4 bits. The value of the pic_order_cnt_lsb is in the range of 0 to MaxPicOrderCntLsb−1, inclusive.

An alternative technique would include not signaling the pic_order_cnt_lsb syntax element for BLA pictures, thus inferring it to be 0 to be consistent with IDR signalling. As a result, the IdrPicFlag derivation is preferably changed to also include BLA. Also, the IdrPicFlag is preferably renamed as IdrBlaPicFlag. Additionally PicOrderCntVal calculation is preferably modified for BLA pictures. Alternatively, a new flag IdrBlaPicFlag may be included while maintaining the IdrPicFlag.

In general IdrPicFlag will be true or 1 if it is an IDR picture. It will be false or zero otherwise. In one case the variable IdrPicFlag is specified as IdrPicFlag=(nal_unit_type==IDR_W_RADL||nal_unit_type==IDR_N_LP), where nal_unit_type refers to the NAL unit type.

In general IdrBlaPicFlag will be true or 1 if it is an IDR picture or a BLA picture. It will be false or zero otherwise. In one case the variable IdrBlaPicFlag is specified as IdrBlaPicFlag=(nal_unit_type==IDR_W_RADL||nal_unit_type==IDR_N_LP||nal_unit_type==BLA_W_LP||nal_unit_type==BLA_W_LP||nal_unit_type==BLA_N_LP), where nal_unit_type refers to the NAL unit_type.

This alternative technique may be employed because the BLA picture contains only I slices and may be the first picture in the bitstream in decoding order, or the BLA picture may appear later in the bitstream. Each BLA picture begins a new coded video sequence, and has the same effect on the decoding process as an IDR picture, as previously described. As a result, having a consistent way of signaling pic_order_cnt_lsb value for BLA and IDR pictures will allow them to be handled similarly by the decoder.

Referring to FIG. 11, to increase the consistency of the decoder in decoding the bitstream, and handling IDR and BLA pictures the pic_order_cnt_lsb syntax element may be signaled in the slice header of pictures other than an IDR picture or a BLA picture (e.g., !IdrBLAPicFlag).

Referring to FIG. 12, to increase the consistency of the decoder in decoding the bitstream, and handling IDR and BLA pictures the pic_order_cnt_lsb syntax element may be signaled in the slice header of pictures other an IDR picture or a BLA picture (e.g., !IdrBLAPicFlag). The remaining portion of the slice header may be signaled for pictures other than an IDR picture (e.g., !IdrPicFlag). Thus the remaining portion of the slice header may be signaled for BLA pictures.

Referring to FIG. 13, the pic_order_cnt_lsb syntax element may be at the beginning of the slice header. The pic_order_cnt_lsb field being at the beginning of the slice header more readily enables it to be checked first in slice header to understand which picture the slice belongs to before parsing other syntax elements in the slice. This is useful in environments where pictures are likely to arrive out-of-order and/or be lost.

Scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety.

Multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of inter-view statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. Hannuksela, et al., "Common specification text for scalable and multi-view extensions," JCTVC-L0452, Geneva, January 2013, is hereby incorporated by reference herein in its entirety. Tech, et. al. "MV-HEVC Draft Text 3 (ISO/IEC 23008-2:201x/PDAM2)," JCT3V-C1004_d3, Geneva, January 2013, is hereby incorporated by reference herein in its entirety.

Referring to FIG. 14, a video parameter set is a syntax that describes content related to a video sequence. The video parameter set syntax is specified by many syntax elements, several of which are described below.

The vps_extension_offset specifies the byte offset of the next set of fixed-length coded information in the VPS NAL unit, starting from the beginning of the NAL unit. The VPS information for the non-base layer or view may start from a byte-aligned position of the VPS NAL unit, with fixed-length coded information for session negotiation and/or capability exchange. The byte offset specified by vps_extension_offset would then help to locate and access information in the VPS NAL unit without the need of entropy decoding.

The vps_extension_flag equal to 0 specifies that no vps_extension( ) syntax structure is present in the VPS RBSP syntax structure. The vps_extension_flag equal to 1 specifies that the vps_extension( ) syntax structure is present in the VPS RBSP syntax structure. When vps_max_layers_minus1 is greater than 0, vps_extension_flag is equal to 1.

The vps_extension2_flag equal to 0 specifies that no vps_extension_data_flag syntax elements are present in the VPS RBSP syntax structure. Decoders may ignore data that follow the value 1 for vps_extension2_flag in a VPS NAL unit.

Accordingly, the video parameter set syntax may flag the existence of extensions having additional characteristics using the vps_extension_flag. Referring to FIG. 15, a video parameter set extension syntax (e.g., vps_extension( )) describes additional syntax elements or metadata related to a video parameter set sequence. The video parameter set extension syntax is specified by many syntax elements, many of which are described below.

The vps_extension_byte_alignment_reserved_one_bit may be equal to 1.

The avc_base_layer_flag equal to 1 specifies that the base layer conforms to ITU-T H.264|ISO/IEC 14496-10 and equal to 0 specifies that it conforms another specification, such as for example, that described herein.

The splitting_flag equal to 1 indicates that the bits of the nuh_layer_id syntax element in the NAL unit header are split into n segments with a length, in bits, according to the values of the dimensionid_len_minus1[i] syntax element and that the n segments are associated with the n scalability dimensions indicated in scalability_mask_flag[i]. When splitting_flag is equal to 1, the value of the j-th segment of the nuh_layer_id of i-th layer is equal to the value of dimension_id[i][j]. Thesplitting_flag equal to 0 does not indicate the above constraint.

The scalability_mask[i] equal to 1 indicates that dimension_id syntax elements corresponding to the i-th scalability dimension in table below are present. The scalability_mask

[i] equal to 0 indicates that dimension_id syntax elements corresponding to the i-th scalability dimension are not present.

| scalability_mask index | Scalability dimension | ScalabilityId mapping |
|---|---|---|
| 0 | multiview | ViewId |
| 1 | spatial/SNR scalability | DependencyId |
| 2-15 | Reserved | |

The dimension_id_len_minus1[j] plus 1 specifies the length, in bits, of the dimension_id[i][j] syntax element. The variable dimBitOffset[0] is set equal to 0 and for j in the range of 1 to NumScalabilityTypes, inclusive, dimBitOffset [j] is derived as follows.

$$dimBitOffset[j] = \sum_{dixIdx=0}^{j-1} (dimension\_id\_len\_minus1[dimIdx] + 1)$$

The vps_nuh_layer_id_present_flag specifies whether the layer_id_in_nuh[i] syntax is present.

The layer_id_in_nuh[i] specifies the value of the nuh_layer_id syntax element in VCL NAL units of the i-th layer. For i in a range from 0 to vps_max_layers_minus1, inclusive, when not present, the value of layer_id_in_nuh[i] is inferred to be equal to i. When i is greater than 0, layer_id_in_nuh[i] is greater than layer_id_in_nuh[i−1]. For i in a range from 0 to vps_max_layers_minus1, inclusive, the variable LayerIdInVps[layer_id_in_nuh[i]] is set equal to i.

The dimension_id[i][j] specifies the identifier of the j-th present scalability dimension type of the i-th layer. When not present, the value of dimension_id[i][j] is inferred to be equal to 0. The number of bits used for the representation of dimension_id[i][j] is dimension_id_len_minus1 [j]+1 bits. When splitting_flag is equal to 1, it is a requirement of bitstream conformance that dimension_id[i][j] shall be equal to ((layer_id_in_nuh[i] & ((1<<dimBitOffset[j+1])−1))>> dimBitOffset[j]).

The variable ScalabilityId[i][smIdx] specifying the identifier of the smIdx-th scalability dimension type of the i-th layer, the variable ViewId[layer_id_in_nuh[i]] specifying the view identifier of the i-th layer and DependencyId [layer_id_in_nuh[i]] specifying the spatial/SNR scalability identifier of the i-th layer are derived as follows:

```
for (i = 0; i <= vps_max_layers_minus1; i++) {
    for( smIdx= 0, j =0; smIdx< 16; smIdx ++ )
        if ( ( i != 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = ScalabilityId[ i ][ 0 ]
    DependencyId [ layer_id_in_nuh[ i ] ] = ScalabilityId[ i ][ 1 ]
}
```

The vps_profile_present_flag[lsIdx] equal to 1 specifies that the profile and tier information for layer set lsIdx is present in the profile_tier_level( ) syntax structure. The vps_profile_present_flag[lsIdx] equal to 0 specifies that profile and tier information for layer set lsIdx is not present in the profile_tier_level( ) syntax structure and is inferred.

The profile_layer_set_ref minus1[lsIdx] indicates that the profile and tier information for the lsIdx-th layer set is inferred to be equal to the profile and tier information from the (profile_layer_set_ref minus1 [lsIdx]+1)-th layer set. The value of profile_layer_set_ref minus1[lsIdx]+1 is less than lsIdx.

The num_output_layer_sets specifies the number of layer sets for which output layers are specified with output_layer_set_index[i] and output_layer_flag[lsIdx][j]. When not present, the value of num_output_layer_sets is inferred to be equal to 0.

The output_layer_set_idx[i] specifies the index lsIdx of the layer set for which output_layer_flag[lsIdx] [j] is present.

The output_layer_flag[lsIdx][j] equal to 1 specifies that the layer with nuh_layer_id equal to j is a target output layer of the lsIdx-th layer set. A value of output_layer_flag[lsIdx] [j] equal to 0 specifies that the layer with nuh_layer_id equal to j is not a target output layer of the lsIdx-th layer set. When output_layer_flag[lsIdx][j] is not present for lsIdx in the range of 0 to vps_num_layer_sets_minus1, inclusive and for j in the range of 0 to 63, inclusive, output_layer_flag[lsIdx] [j] is inferred to be equal to (j==LayerSetLayerIdList[lsIdx] [NumLayersInIdList[lsIdx]−1]).

The direct_dependency_flag[i][j] equal to 0 specifies that the layer with index j is not a direct reference layer for the layer with index i. The direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it is inferred to be equal to 0.

The variables NumDirectRefLayers[i] and RefLayerId[i] [j] may be derived as follows:

```
for( i = 1; i <= vps_max_layers_minus1; i++ )
    for( j = 0, NumDirectRefLayers[ i ] = 0; j < i; j++ )
        if( direct_dependency_flag[ i ][ j ] == 1 )
            RefLayerId[ i ][ NumDirectRefLayers[ i ]++ ] =
                layer_id_in_nuh[ j ]
```

In JCTVC-L0453, LCTVC-L0452, and LCTVC-L1008 the following restriction is included. When the nal_unit_type value nalUnitTypeA is equal to IDR_W_RADL, IDR_N_LP, BLA_W_LP, BLA_W_RADL or BLA_N_LP for a coded picture with a particular PicOrder CntVal value and with a particular CVS, the nal_unit_type value shall be equal to nalUnitTypeA for all VCL NAL units of all coded pictures with the same particular PicOrderCntVal value and within the same particular CVS. In some case IDR_W_RADL and BLA_W_RADL may be referred instead as IDR_W_DLP and BLA_W_DLP respectively.

Figure 16:
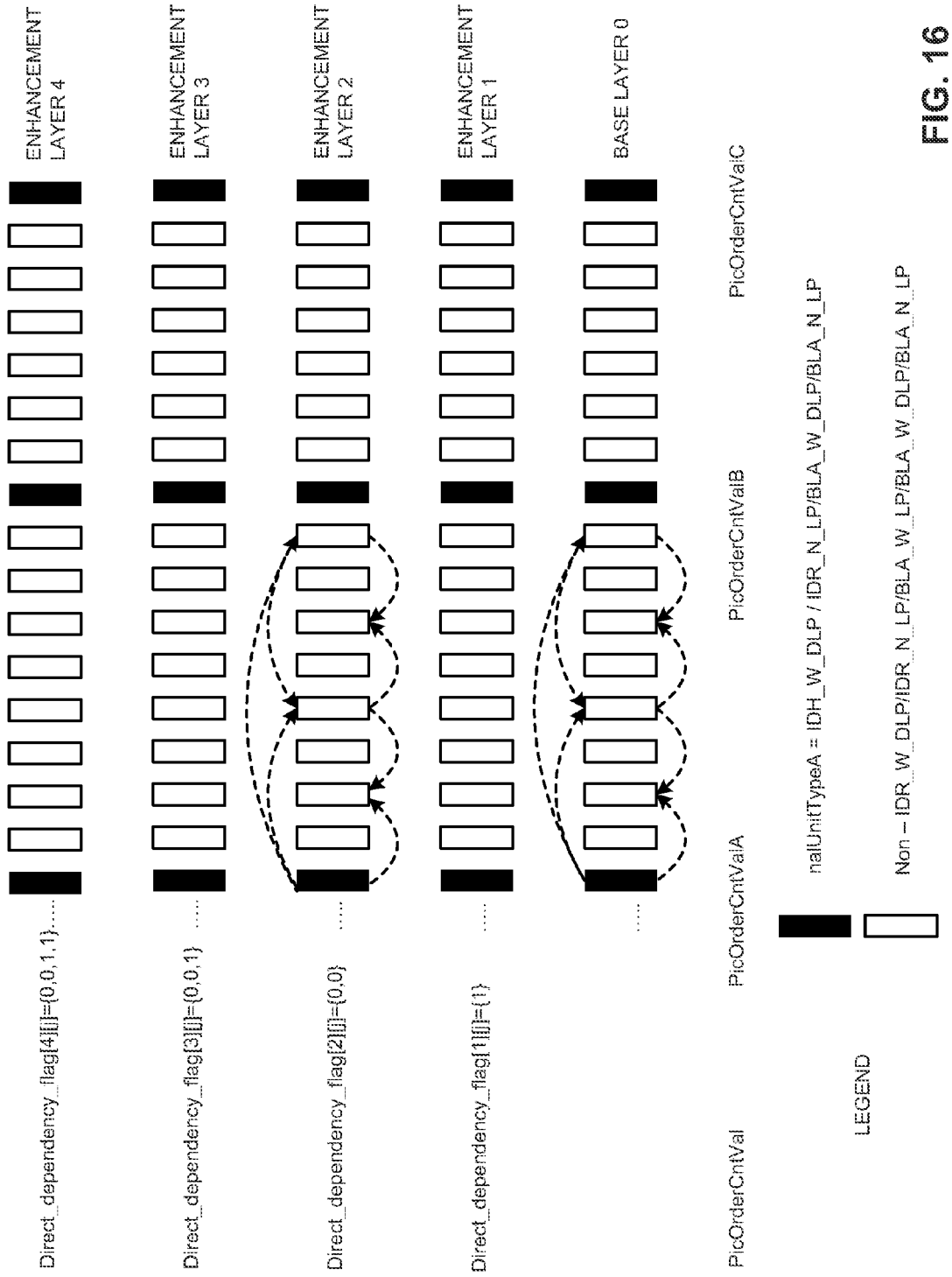
FIG. 16 illustrates a restriction on IDR/BLA pictures.

Referring to FIG. 16, this restriction on the NAL unit_type is graphically illustrated. For different types of IDR pictures (e.g., IDR_W_RADL, IDR_N_LP) and BLA pictures (BLA_W_LP, BLA_W_RADL or BLA_N_LP) the restriction is enforced for each of the enhancement layers (e.g., enhancement layers 1, 2, 3, 4) relative to the base layer (e.g., base layer 0). Accordingly, if a picture of the base layer is either an IDR or a BLA picture then each of the enhancement layers for the same PicOrderCntVal is likewise a corresponding IDR or BLA picture.

It was determined that the use of the base layer and the enhancement layer(s) may be used to simulcast a pair (or more) of video streams within the same video stream. In this manner, for example, the base layer 0 and the enhancement layer 1 may be a first video stream, and the enhancement layer 2, enhancement layer 3, and enhancement layer 4 may be a second video stream. For example the two video streams may have the same video content but may use different bitrates for different base layers and enhancement layers. They may also use different coding algorithm (e.g. HEVC/AVC) for different base layers. In this manner, the enhancement layer 2 does not depend upon either the enhancement layer 1 nor the base layer 0. Also, the enhancement layer 3 and enhancement layer 4 do not depend on either the enhancement layer 1 nor the base layer 0. The enhancement layer 3 may depend on the enhancement layer 2, and the enhancement layer 4 may depend upon both the enhancement layer 3 and the enhancement layer 2. Preferably, an enhancement layer may only depend upon an enhancement layer with a smaller number and not on an enhancement layer with a larger number.

This particular enhancement layer dependency is signaled using the direct_dependency_flag to indicate for each layer what other layers it may directly depend upon. For example direct_dependency_flag[1][j]={1} indicates that enhancement layer 1 may depend upon base layer 0. For example direct_dependency_flag[2][j]={0,0} indicates that enhancement layer 2 does not depend upon another layer. For example directdependency_flag[3][j]={0,0,1} indicates that enhancement layer 3 does not depend upon base layer 0, does not depend upon enhancement layer 1, and may depend upon enhancement layer 2. For example direct_dependency_flag[4][j]={0,0,1,1} indicates that enhancement layer 4 does not depend upon base layer 0, does not depend upon enhancement layer 1, may depend upon enhancement layer 2, and may depend upon enhancement layer 3. With the potential of simulcast configurations, the restriction on the direct_dependency_flag[i][j] may be redefined to permit the IDR and BLA frequency to be different when a simulcast configuration is used. In other words, the IDR and BLA restrictions may be restricted for each of the simulcast streams, but may be independent of one another for each of the simulcast streams.

Figure 17:
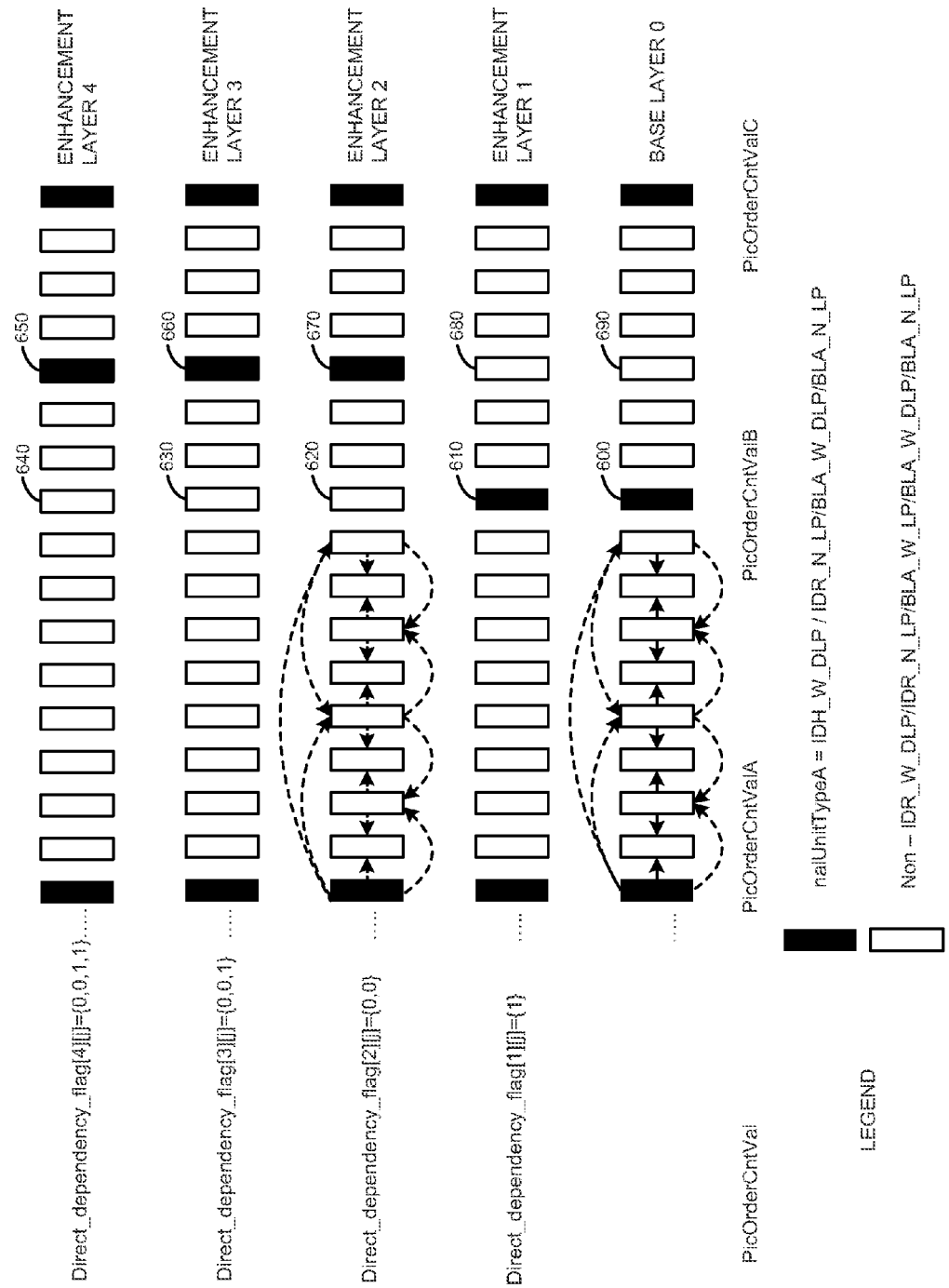
FIG. 17 illustrates simulcast IDR/BLA pictures.

Referring to FIG. 17, a simulcast of two video streams is illustrated, a first video stream including the base layer 0 and the enhancement layer 1; and the second video stream including the enhancement layer2, the enhancement layer 3, and the enhancement layer 4. As illustrated, the first video stream includes a corresponding pair of IDR/BLA pictures 600, 610 for PicOrderCntVal having a value of PicOrderCntValB, while the second video stream does not include a corresponding set of IDR/BLA pictures 620, 630, 640 for the PicOrderCntVal having a same value of PicOrderCntValB. As illustrated, the second video stream includes a corresponding set of IDR/BLA pictures 650, 660, 670, while the first video stream does not include a corresponding pair of IDR/BLA pictures 680, 690.

Referring to FIG. 17, in particular this flexibility may be achieved, for example, by considering the direct_dependency_flag[i][j] values signaled for a layer in the VPS extension. The variables IndepLayer[i] may be determined for each layer, namely, whether the layer is independent (e.g., 0) or dependent upon another layer (e.g., 1). This IndepLayer[i] may be derived as follows:

```
for( i = 1; i <= vps_max_layers_minus1; i++ )
{
    IndepLayer[i]=0
        if(NumDirectRefLayers[i]==0
            IndepLayer[i]=1;
}
```

Accordingly, for the example illustrated in FIG. 17 base layer 0 and enhancement layer 2 are both independent layers. Alternatively, the independent layers may be inferred from NumDirectRefLayers[i] without using the additional syntax IndepLayer[i]. For example IndepLayer[i] will be equal to 1 when NumDirectRefLayers [i] is equal to 0. Also IndepLayer[i] will be equal to 0 when NumDirectRefLayers [i] is not equal to 0.

In the syntax, the nuh_layer_id specifies the identifier of the layer should be modified from "when the nal_unit_type value nalUnitTypeA is equal to IDR_W_RADL, IDR NLP, BLA_W_LP, BLA_W_RADL or BLA_N_LP for a coded picture with a particular PicOrderCntVal value and within a particular CVS, the nal_unit_type value shall be equal to nalUnitTypeA for all VCL NAL units of all coded pictures with the same particular PicOrderCntVal value and within the same particular CVS" to a modified semantic to enable the simulcast embodiment previously described.

One modified semantic for the nal_unit_type may be as follows: when the nal_unit_type value nalUnitTypeA is equal to IDR_W_RADL, IDR NLP, BLA_W_LP, BLA_W_RADL or BLA_N_LP for a coded picture with a particular PicOrderCntVal value and with nuh_layer_id value nuhLayerIdA and with IndepLayer[LayerIdInVps[nuhLayerIdA]] equal to 1 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] equal to nuhLayerIdA.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with NumDirectRefLayers [LayerIdInVps[nuhLayerIdA]] equal to 0 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with NumDirectRefLayers [LayerIdInVps[nuhLayerIdB]] not equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] equal to nuhLayerIdA.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with IndepLayer[LayerIdInVps[nuhLayerIdA]] equal to 1 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] which has nuhLayerIdA as a direct reference layer.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with NumDirectRefLayers [LayerIdInVps[nuhLayerIdA]] equal to 0 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with NumDirectRefLayers [LayerIdInVps[nuhLayerIdB]] not equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] which has nuhLayerIdA as a direct reference layer.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with IndepLayer[LayerIdInVps[nuhLayerIdA]] equal to 1 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] which has nuhLayerIdA as a direct reference layer for itself or for one of its direct or indirect reference layers.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with NumDirectRefLayers [LayerIdInVps[nuhLayerIdA]] equal to 0 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with NumDirectRefLayers [LayerIdInVps[nuhLayerIdB]] not equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] which has nuhLayerIdA as a direct reference layer for itself or for one of its direct or indirect reference layers.

Another modified semantic for the nal_unit_type may be as follows: when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA and with IndepLayer[LayerIdInVps[nuhLayerIdA]] equal to 1 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] equal to nuhLayerIdA or at least one of the RefLayerId[LayerIdInVps[nuhLayerIdB]][j] has nuhLayerIdA as a direct reference layer for itself or for one of its direct reference layers.

Another modified semantic for the nal_unit_type may be as follows: when the nal_unit_type value nalUnitTypeA is equal to IDR_W_RADL, IDR NLP, BLA_W_LP, BLA_W_RADL or BLA_N_LP for a coded picture with a particular PicOrderCntVal value and with nuh_layer_id value nuhLayerIdA and with NumDirectRefLayers [LayerIdInVps[nuhLayerIdA]] equal to 0 within a particular CVS, the nal_unit_type value shall be equal to nalUnitTypeA for all VCL NAL units of all coded pictures with the same particular PicOrderCntVal value and within the same particular CVS when they have nuh_layer_id value nuhLayerIdB with nuhLayerIdB>nuhLayerIdA and with NumDirectRefLayers [LayerIdInVps[nuhLayerIdB]] not equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB]][j] equal to nuhLayerIdA or at least one of the RefLayerId[LayerIdInVps[nuhLayerIdB]][j] has nuhLayerIdA as a direct reference layer for itself or for one of its direct reference layers.

In each of the above modified semantics for the nal_unit_type may be specified in some embodiments by replacing "when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA" with "when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value layer_id_in_nuh[nuhLayerIdA]".

In each of the above modified semantics for the nal_unit_type may be added to the restriction other than the NALunit types IDR_W_RADL, IDR_N_LP, BLA_W_LP, BLA_W_RADL or BLA_N_LP. For example each CRA NAL unit that belongs to the CRA access unit that is the first access unit in the bitstream in decoding order, is the first access unit that follows an end of sequence NAL unit in decoding order, or has HandleCraAsBlaFlag equal to 1 could be added to the restriction. Thus in these case for example in all of the above variants the restriction could be specified in some embodiments by replacing "when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and with nuh_layer_id value nuhLayerIdA" with "when the nal_unit_type value nalUnitTypeA is equal to IDR_W_RADL, IDR_N_LP, BLA_W_LP, BLA_W_RADL or BLA_N_LP or CRA NUT that belongs to the CRA access unit that is the first access unit in the bitstream in decoding order or CRA NUT that belongs to the CRA access unit that is the first access unit that follows an end of sequence NAL unit in decoding order or a CRA NUT with HandleCraAsBlaFlag equal to 1 for a coded picture with a particular PicOrderCntVal value and with nuh_layer_id value nuhLayerIdA"

The order of presentation of the NAL units and association to coded pictures, access units, and coded video sequences may be modified from, "A coded picture with nuh_layer_id equal to nuhLayerIdA and with a PicOrder- CntVal value equal to picOrderCntValA shall precede in decoding order all coded pictures with nuh_layer_id greater than nuhLayerIdA and with a PicOrderCntVal value equal to picOrderCntValA, if present" to a modified presentation where only the decoding order of NAL units within a stream of a simulcast needs to obey the above restriction on the order of NAL units. Thus the restriction about the order of NAL units does not need to be obeyed across independent video streams being simulcast.

A modified decoding order of the NAL units and association to coded pictures, access units, and coded video sequences may be as follows: a coded picture with nuh_layer_id equal to nuhLayerIdA and with a PicOrderCntVal value equal to picOrderCntValA and with IndepLayer[LayerIdInVps[nuhLayerIdA]] equal to 1 shall precede in decoding order all coded pictures with nuh_layer_id nuhLayerIdB with nuhLayerIdB>nuhLayerIdA and with a PicOrderCntVal value equal to picOrderCntValA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB] ][j] equal to nuhLayerIdA, if present.

A modified decoding order of the NAL units and association to coded pictures, access units, and coded video sequences may be as follows: A coded picture with nuh_layer_id equal to nuhLayerIdA and with a PicOrderCntVal value equal to picOrderCntValA and with IndepLayer[LayerIdInVps[nuhLayerIdA]] equal to 1 shall precede in decoding order all coded pictures with nuh_layer_id nuhLayerIdB with nuhLayerIdB>nuhLayerIdA and with a PicOrderCntVal value equal to picOrderCntValA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB] ][j] which has nuhLayerIdA as a direct reference layer, if present.

A modified decoding order of the NAL units and association to coded pictures, access units, and coded video sequences may be as follows: a coded picture with nuh_layer_id equal to nuhLayerIdA and with a PicOrderCntVal value equal to picOrderCntValA and with IndepLayer[LayerIdInVps[nuhLayerIdA]] equal to 1 shall precede in decoding order all coded pictures with nuh_layer_id nuhLayerIdB with nuhLayerIdB>nuhLayerIdA and with a PicOrderCntVal value equal to picOrderCntValA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB] ][j] which has nuhLayerIdA as a direct reference layer for itself or for one of its direct or indirect reference layers, if present.

A modified decoding order of the NAL units and association to coded pictures, access units, and coded video sequences may be as follows: a coded picture with nuh_layer_id equal to nuhLayerIdA and with a PicOrderCntVal value equal to picOrderCntValA and with IndepLayer[LayerIdInVps[nuhLayerIdA]] equal to 1 shall precede in decoding order all coded pictures with nuh_layer_id nuhLayerIdB with nuhLayerIdB>nuhLayerIdA and with a PicOrderCntVal value equal to picOrderCntValA and with IndepLayer[LayerIdInVps[nuhLayerIdB]] equal to 0 and at least one of the j in the range of 0 to NumDirectRefLayers[LayerIdInVps[nuhLayerIdB]]−1 inclusive has a layer with nuh_layer_id value RefLayerId[LayerIdInVps[nuhLayerIdB] ][j] equal to nuhLayerIdA or at least one of RefLayerId[LayerIdInVps[nuhLayerIdB] ][j] has nuhLayerIdA as a direct reference layer for itself or for one of its direct reference layers, if present.

In all of the above variants the order restriction may be specified in some embodiments by replacing "IndepLayer[LayerIdInVps[nuhLayerIdA]] equal to 1" with "NumDirectRefLayers [LayerIdInVps[nuhLayerIdA]] equal to 0" and by replacing "IndepLayer[LayerIdInVps[nuhLayerIdB]] equal to 0" by "NumDirectRefLayers [LayerIdInVps[nuhLayerIdB]] not equal to 0".

In an alternative embodiment the following restriction may be used: For each layer i with nuh-layer_id>0 the bitstream is in conformance with $$\sum_{j=0}^{i-1} \text{direct\_dependency\_flag}[i][j] \mathrel{!=} 0.$$

In another alternative embodiment the following restriction may be used: For each layer i with nuh-layer_id>0 the bitstream is in conformance with $$\sum_{j=0}^{i-1} \text{direct\_dependency\_flag}[i][j] \geq 1.$$

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A computer-implemented method for decoding a video bitstream comprising:
   (a) receiving, with a processor, a base layer bitstream and one or more enhancement bitstreams representative of a video sequence which are provided over a bus or stored in a memory;
   (b) decoding, with the processor, the base layer bitstream and each of the one or more enhancement layer bitstreams, wherein in a case that a picture of the base layer bitstream in an access unit is an intra random access point (IRAP) picture, a picture for each of the one or more enhancement layer bitstreams in a same access unit is an IRAP picture, wherein one or more flags included in a Video Parameter Set (VPS) extension stored in the memory is used to indicate whether or not the base layer bitstream is a direct reference layer for each of the one or more enhancement layer bitstreams, wherein the VPS is a syntax structure that describes content related to a video seguencel and a video parameter set extension syntax describes additional syntax elements or rnetadata related to a video sequence;
   (c) outputting, with the processor, one or more decoded pictures corresponding to the picture of the base layer bitstream and the picture for at least each of the one of the one or more enhancement layer bitstreams; wherein the direct reference layer for each of the at least one of the one or more enhancement layer bitstreams is a layer upon which each of the at least one of the one or more enhancement layer bitstreams is directly dependent;

(d) wherein the base layer bitstream is the direct reference layer for each of the at least one of the one or more enhancement layer bitstreams in a case that a value of a direct dependency flag is equal to 1; and (e) wherein the IRAP picture is an instantaneous decoding refresh (IDR) picture or a broken link access (BLA) picture, wherein the IDR picture is a picture having a nal unit type equal to IDR W RADL or IDR N LP and the BLA picture is a picture having a nal unit type equal to BLA W LP, BLA W RADL or BLA N LP.

2. The method according to claim 1, wherein each picture for each of the at least one of the one or more enhancement layer bitstreams has a same value of nal_unit_type as the picture of the base layer bitstream.

* * * * *